D. A. ROSE.
AUTOMOBILE EXTRACTOR.
APPLICATION FILED FEB. 15, 1919.
1,312,579.
Patented Aug. 12, 1919.
2 SHEETS—SHEET 1.
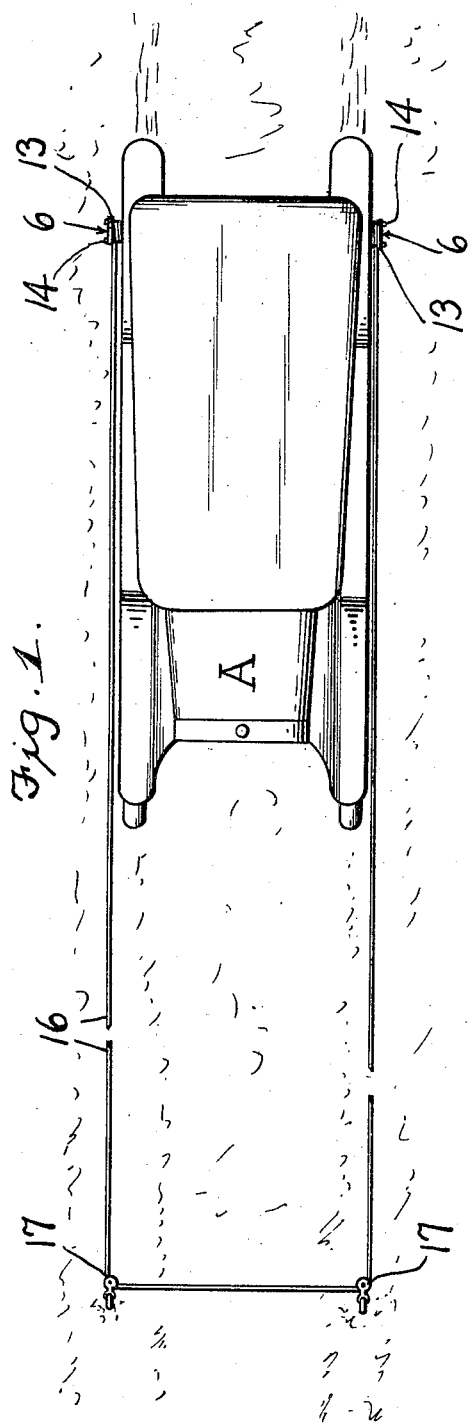
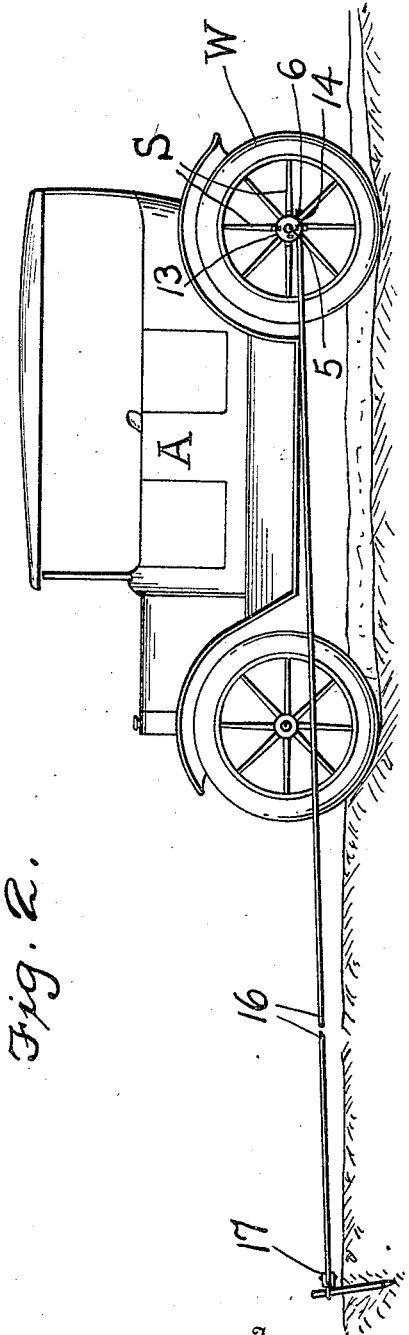
Inventor
Daniel A. Rose
By A. Milton Buck
Attorney D. A. ROSE.
AUTOMOBILE EXTRACTOR.
APPLICATION FILED FEB. 15, 1919.
1,312,579.
Patented Aug. 12, 1919.
2 SHEETS—SHEET 2.
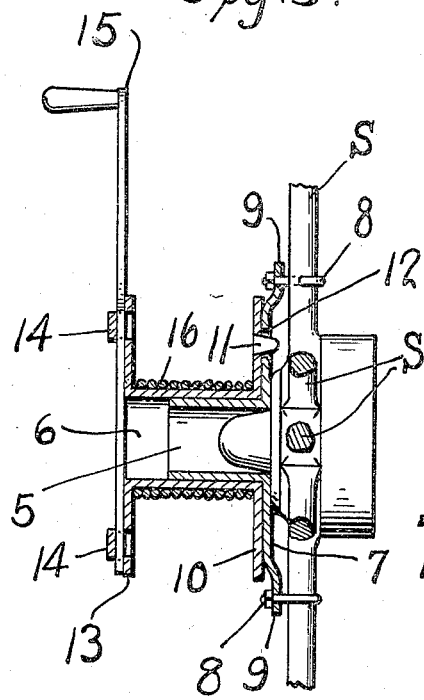
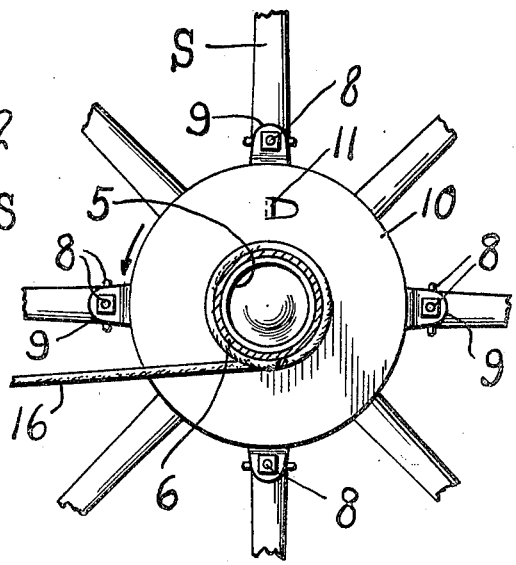
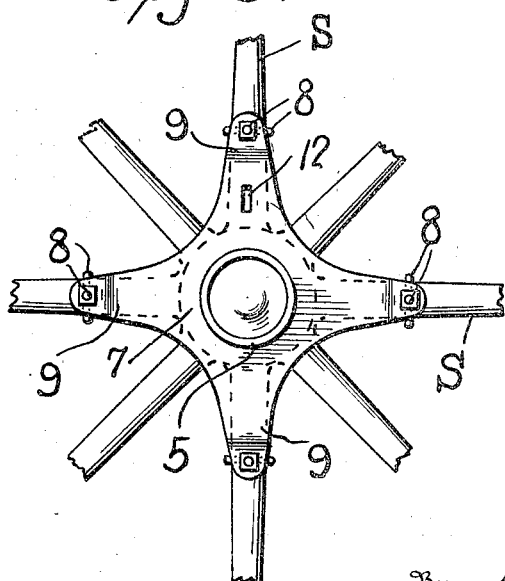
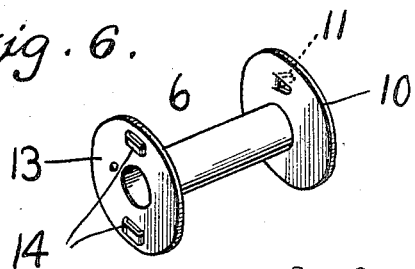
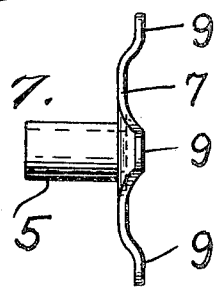
Inventor
Daniel A. Rose
By A. Milton Buck
Attorney

UNITED STATES PATENT OFFICE.

DANIEL A. ROSE, OF HILLS, IOWA.

AUTOMOBILE-EXTRACTOR.

1,312,579.   Specification of Letters Patent.   Patented Aug. 12, 1919.

Application filed February 15, 1919. Serial No. 277,169.

*To all whom it may concern:*

Be it known that I, DANIEL A. ROSE, a citizen of the United States, residing at Hills, in the county of Johnson and State of Iowa, have invented certain new and useful Improvements in Automobile Extractors, of which the following is a specification.

This invention relates to automobiles, and more particularly to a detachable windlass therefor.

The primary object of this invention resides in the provision of a detachable windlass for automobiles which utilizes the power of the automobile to pull it out of a mud hole.

Another object of this invention resides in the provision of a detachable windlass for automobiles which can be operated by hand while on the automobile to wind the slack in the cable thereon.

A still further object of this invention resides in the provision of a detachable windlass which is removably secured to the rear or driving wheels of an automobile so that the windlass can be readily reversed without turning the automobile wheels.

With these and other objects in view, this invention resides in certain novel features of construction and arrangement of elements to be more particularly set forth in the specification herewith and pointed out in the appended claims, it being understood that the right is reserved to resort to such changes in construction as come within the scope of the claims.

In the accompanying drawing:—

Figure 1 is a plan view of an automobile showing the elements of this invention in operative position thereon;

Fig. 2 is a side view thereof;

Fig. 3 is an enlarged sectional view of the elements comprising this invention as assembled on a portion of a wheel;

Fig. 4 is a sectional view on line 4—4 of Fig. 3.

Fig. 5 is a side view of a portion of a wheel showing the removable trunnion secured thereto and the windlass removed;

Fig 6 is a detail perspective view of the windlass;

Fig. 7 is a detail side view of the removable trunion. In the present embodiment of this invention the letter A designates an automobile to the rear wheels W of which is removably secured outwardly projecting trunnions 5 for the reception of a removable windlass 6.

The aforesaid trunnions 5 are rigidly secured to or pressed from the centers of the base plates 7 which are adapted to bear against the outer faces of the wheel hubs when the securing elements 8 thereof are tightened on the spokes S of the wheels. These plates 7 are herein shown as having a plurality of radially extending arms 9 for alinement with the spokes S and the reception of the threaded ends of the fastening elements 8.

Adapted to be operatively assembled on the trunnions 5 after they have been secured to the power wheels of an automobile are the cable drums or windlasses 6. These drums or windlasses have their inner flanges 10 provided with an outwardly projecting lug 11 disposed at an angle to the surface of the flanges so that its insertion in slot 12 in the plates 7 will retain them in locked relation with the plate 7 when the automobile wheels are rotated to advance through mud or the like.

The outer flanges 13 of the windlasses are provided with outwardly pressed lugs 14 between the inner surfaces of which and the outer surfaces of the flanges 13 is adapted to be inserted a handle 15 for winding the slack of the cable 16 on the windlass.

In utilizing the handle 15 for taking the slack up in the cable, it is necessary to rotate the windlasses rearwardly whereupon the angularity of the lugs 11 will release the windlasses from the plates 7 and during the continuance of the rearward rotation of the windlasses, the same will not lock to the plates 7 but during the rotation of the driving wheels, the plates 7 will lock to the windlasses and remain so during the continuation of the pulling action on the cable.

The aforesaid cable 16 which is utilized in connection with the aforesaid windlasses is secured to the windlass on one of the driving wheels of an automobile from which it is extended forwardly through pulleys 17 that are temporarily anchored in advance of the automobile, and has its free end secured to the windlass that is fastened to the driving wheel on the opposite side of the automobile. With the cable so disposed and upon applying power to the driving wheels of the automobile, the windlasses will wind the cable thereon and pull the automobile toward the anchored pulleys 17.

After the automobile has extracted itself from the mud, it is driven over the cable between the pulleys and the handle 15 is inserted in locked relation with one of the windlasses to wind the slack thereon after which the windlasses are removed from the trunnions 5 and stored in the automobile for further use.

With windlasses of the aforesaid construction, it is necessary to employ the detachable plates 7, on automobiles of the present type, but in constructing new automobiles, the hubs of their driving wheels are to be provided with trunnions and slots to accommodate the windlasses as hereinbefore stated.

With this invention fully set forth, it is manifest that means are provided for extracting an automobile from mud holes or the like with the power heretofore lost through the spinning action of the driving wheels in the mud and through the simplicity of the present embodiment of elements, the expense of production will be small.

Having thus described this invention, what I claim is:—

1. The combination with a vehicle wheel, of a base plate secured to said wheel, having a slot and projecting tubular trunnion, a cable drum revolubly held on said trunnion having an outstanding lug arranged for coaction with said slot and a handle removably secured to said drum, whereby on rotating said wheel in one direction said drum will be rotated, said drum being removably held on said trunnion.

2. In combination, a base plate having a slot and a projecting tubular trunnion, a cable drum revolubly and removably held to said trunnion, with a projecting angularly extending ear at its inner end arranged for coaction with said slot and two outstanding lugs on its outer end, and an operating handle arranged to engage said lugs, whereby on rotating said handle said drum is rotated.

3. In combination, a base plate having a slot and a projecting tubular trunnion, a cable drum revolubly and removably held to said trunnion, with a projecting angularly extending ear at its inner end arranged for coaction with said slot and two outstanding lugs on its outer end, and an operating handle arranged to engage said lugs, whereby on rotating said handle said drum is rotated, and a cable having one end secured to said drum.

4. In combination, a base plate having an outstanding tubular trunnion and a slot, a drum revolubly and removably held on said trunnion having an ear to engage said slot and means to rotate said drum.

In testimony whereof I affix my signature.

DANIEL A. ROSE.

Copies of this patent may be obtained for five cents each, by addressing the "Commissioner of Patents, Washington, D. C."